Sept. 23, 1941.  H. WOCHNER  2,256,968
WHEEL ALIGNING INSTRUMENT
Filed Dec. 18, 1939
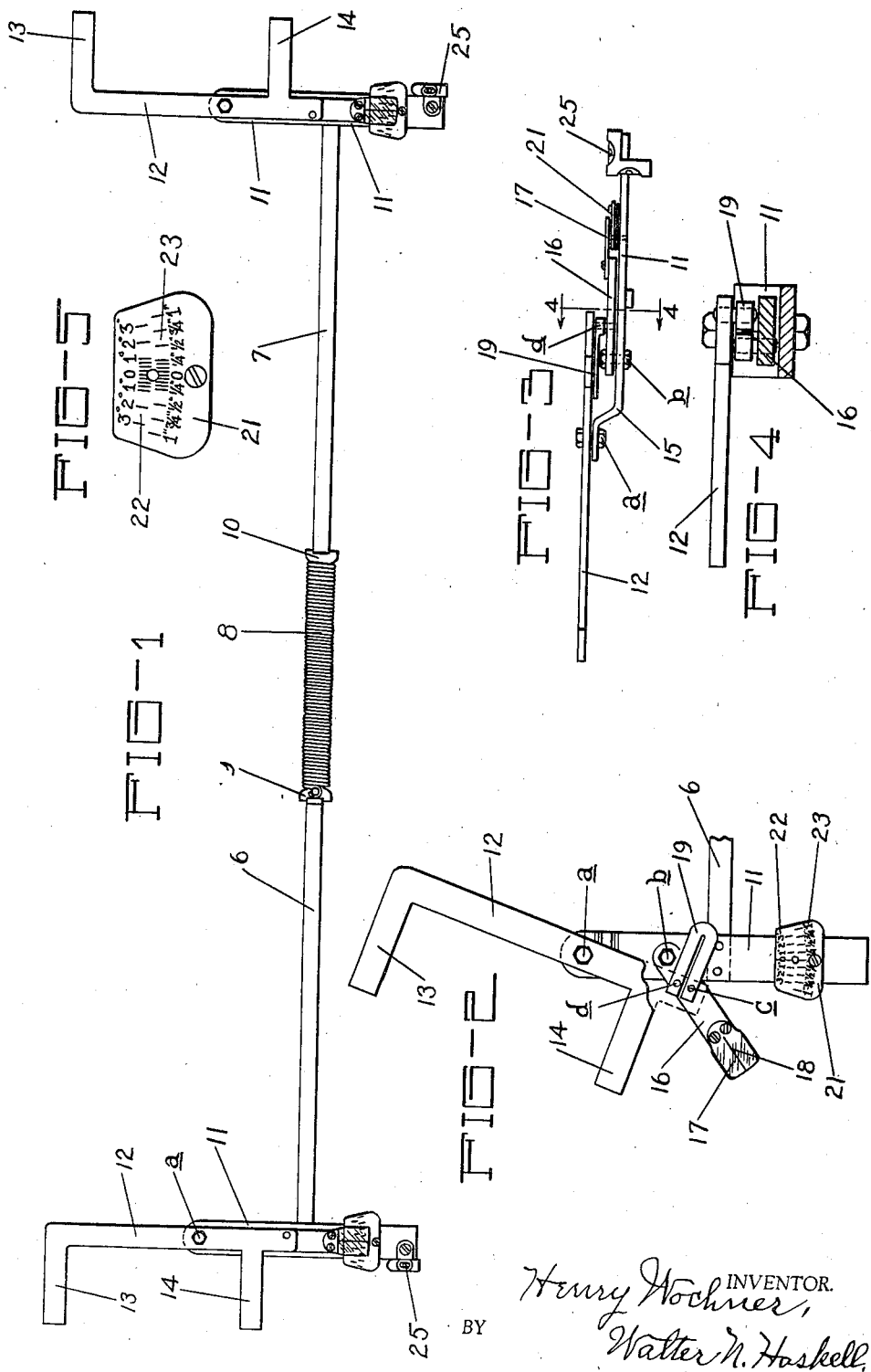
Henry Wochner INVENTOR.
BY Walter N. Haskell,
his ATTORNEY.

Patented Sept. 23, 1941

2,256,968

UNITED STATES PATENT OFFICE 2,256,968

WHEEL ALIGNING INSTRUMENT

Henry Wochner, Rock Island, Ill.

Application December 18, 1939, Serial No. 309,833

1 Claim. (Cl. 33—203)

My invention has reference to a wheel aligning instrument, and has for its chief purpose to improve upon instruments of that type, one of which is shown in the application of A. I. Sandbo, for Letters Patent of the United States No. 1,516,549, dated Nov. 25, 1924. Another purpose thereof is to adapt a device of that kind to present day requirements, and make it possible to use the same in making tests of cars, the wheels of which have a knee action support, and other modern features of an automobile.

The invention is of such a character as to be readily usable for tests in measuring camber of a pair of front wheels, or for determining the amount of toe-in thereof. This is done by the means of a single indicator and gauge plate, but with different scale markings on such plate. The instrument is also of a delicate and quick-responsive character, and is capable of giving indications in degrees and fractions of degrees. It is also possible by the use thereof to show a reverse marking for use with some motor vehicles which are provided with a reverse or negative camber when devoid of any burden, and which upon being loaded, are converted to a positive camber.

The above named, and other features and advantages of the invention will more fully appear from the following specification, reference being had to the accompanying drawing, in which:

Fig. 1 is a plan view of an instrument embodying the invention, when not in use.

Fig. 2 shows one of the measuring and indicating devices, in detail, partly broken away, and with the parts moved into an extreme position for the purpose of illustration.

Fig. 3 is an edge view of one end of the instrument.

Fig. 4 is a cross-section on line 4—4 of Fig. 3.

Fig. 5 is an enlarged showing of the gauge plate 21.

The instrument is provided with a connecting frame formed of bars 6 and 7, having overlapping ends at the central part, and provided at said ends with guides 9 and 10, permitting a limited telescopic movement of the bars at that point. Between the guides 9 and 10, on the connecting frame, is an extensile coiled spring 8, bearing at its end against the guides and tending to hold the bars 6 and 7 yieldably in extended position. An arrangement similar to that above described has been in common use in instruments of this type.

The instrument is of dual construction, and the tools at the end of the frame are identical in construction, except that each is in reversed position with respect to the other, so that they can be oppositely used on the inner faces of a pair of automobile wheels. Said parts are similarly numbered in the drawing, and when one of said parts is mentioned it will be understood to relate to both of said end tools and their associated parts.

Fixed to the ends of the bars 6 and 7, are plates 11, so as to be in T formation therewith, and having a pivotal connection with the plate 11, as at a, is an arm 12, provided with a pair of outwardly projected fingers 13 and 14, at right angles to the arm 12, and in parallel spaced relation with respect to each other.

The plate 11 is spaced downwardly from the arm 12, by means of a bend at 15, and on the upper face of the plate 11 is pivoted, as at b, an indicator arm 16, provided at its free end with a transparent plate 17, on the center line of which is a visual hair line 18, for convenience in making readings on gauges adjacent thereto. Having pivotal connection with the arm 16, as at d, is a U-lever 19, the other end of which is pivoted to the short end of the arm 12, as at c. In the normal position of the tool, the plate 11 and arm 12 are in alignment, as shown in Fig. 1, with the lever 19 folded into the space between the plate and arm. A slight movement of the arm 12 to either side of the plate will cause a swinging movement of the arm 16 in the same direction, resulting in a change in the position of the indicator 17 with reference to a gauge plate 21, provided on its upper face with graduated scales 22 and 23. The hair-line 18 is of sufficient length to be readable on either scale, and the upper scale 22 has markings in degrees and fractions of degrees, and is designed for use in testing the camber of one or both of a pair of wheels, the instrument being held for that purpose with the arms 12 in a vertical position, and between the wheels, with the ends of the fingers 13 and 14 in contact with some of the wheel parts, on the inner faces thereof. The amount of variation, if any, from a vertical line will be indicated on the scale 22. In the present construction of cars, especially of the knee-action type, it is usual to have a little reverse camber, of approximately one degree, when the vehicle is without a load, which is converted into a positive camber when loaded, and the scale shows a zero mark at center, to one side of which the line 18 will move for reverse camber, changing to the other side when the camber shifts to positive, and showing the degrees thereof. If the indication on the scale does not meet with the requirements, the necessary corrections can be made.

The arms of the U-lever 19 are sufficiently rigid in their own plane to cause a positive action thereof in imparting the movement of the arm 12 to the indicator 16, but said arms are sufficiently resilient to permit a limited spring action thereof to one side or other of said plane. This will prevent any breakage of the parts, and especially relieve the stress occasioned by a tendency of the parts 12 and 16 to move away from each other to prevent the pivot pins at c and d from being torn from their seats. The connections between the parts 12 and 16 are also of a character to cause a multiplication of the movement of the latter part, of approximately four of the indicator arm to one of the arm 12. From an examination of Fig. 2 it will be evident that the amount of angular swing of the part 16 with reference to the plate 11 is much greater than that of the arm 12. This results in a quick response of the indicator to the movement of the arm, and a showing by the indicator of a slight movement of the arm.

When it is desired to determine the amount of toe-in of the front wheels of a vehicle, the instrument is used in the same manner as before, but with the arms 12 in a horizontal position, and with the reading on the scale 23. This scale is also of a dual character, with a zero mark at the center, and graduations extending each way therefrom. The markings are spaced and numbered to show the toe-in variations in inches.

Fixed to the end of the plate 11 is a level device 25, of dual form, (Fig. 1) with one branch for showing when the arms 12 are in a vertical position, and another branch for indicating a horizontal position thereof. By this means the tools at the ends of the instrument are properly positioned before a test is made therewith.

What I claim, and desire to secure, is:

A device of the class described, comprising a bar and cross-plate at the end thereof, a gauge on said plate provided with scales, for reading in connection with making tests of alignments of automobile wheels, an indicator arm pivoted to said plate in line therewith, and provided with means for reading on one or other of said scales independently of the others, a wheel contact arm pivoted to said plate, in alignment with the pivot of said indicator arm and with the center line of said gauge, and a U-shaped connection between the contact arm and the indicator arm pivoted to said parts respectively at its ends, having a limited amount of resiliency for lateral play.

HENRY WOCHNER.